US008776374B2

(12) United States Patent  
Johnston et al.

(10) Patent No.: US 8,776,374 B2
(45) Date of Patent: Jul. 15, 2014

(54) METHOD AND APPARATUS FOR MANUFACTURING AN AXLE FOR A VEHICLE

(75) Inventors: Chris Johnston, Toronto (CA); Robert Taves, Stokes Bay (CA)

(73) Assignee: Trimtool Ltd. O/A 1823912 Ontario Inc., Stokes Bay (CA)

( * ) Notice: Subject to any disclaimer, the term of this patent is extended or adjusted under 35 U.S.C. 154(b) by 1082 days.

(21) Appl. No.: 12/770,987

(22) Filed: Apr. 30, 2010

(65) Prior Publication Data

US 2011/0265330 A1    Nov. 3, 2011

(51) Int. Cl.
*B23P 15/00* (2006.01)
*B23P 17/00* (2006.01)
*B60B 35/16* (2006.01)

(52) U.S. Cl.
USPC ............................ 29/897.2; 29/56.5; 29/33 B

(58) Field of Classification Search
CPC .......... B23P 15/00; B23P 17/00; B60B 35/16
USPC ....... 29/897.2, 56.5, 33 B, DIG. 37; 228/170; 280/124.11, 124.12
See application file for complete search history.

(56) References Cited

U.S. PATENT DOCUMENTS

| 1,926,353 | A |   | 9/1933  | Spatta          |
|-----------|---|---|---------|-----------------|
| 1,940,305 | A |   | 12/1933 | Kapitke et al.  |
| 1,945,077 | A |   | 1/1934  | Riemenschneider |
| 1,962,944 | A |   | 6/1934  | Spatta          |
| 1,978,685 | A |   | 10/1934 | Mogford et al.  |
| 2,178,350 | A |   | 10/1939 | Spatta          |
| 2,199,502 | A |   | 5/1940  | Maddock         |
| 2,674,783 | A |   | 4/1954  | Schneider et al.|
| 2,752,673 | A |   | 7/1956  | Williams        |
| 3,015,238 | A | * | 1/1962  | Williams ........................ 74/607 |
| 3,583,188 | A |   | 6/1971  | Nakamura        |
| 3,685,340 | A |   | 8/1972  | Lamm            |
| 3,793,703 | A |   | 2/1974  | Winkler et al.  |
| 3,858,429 | A |   | 1/1975  | Winkler et al.  |
| 4,571,795 | A | * | 2/1986  | Shiets .......................... 29/26 B |
| 4,756,466 | A |   | 7/1988  | Peck            |
| 4,760,755 | A | * | 8/1988  | Peck ........................... 74/606 R |
| 4,768,839 | A | * | 9/1988  | Spindler .................... 301/124.1 |
| 4,841,802 | A |   | 6/1989  | Peck            |

(Continued)

FOREIGN PATENT DOCUMENTS

WO    00/25973    5/2000

*Primary Examiner* — Peter DungBa Vo
*Assistant Examiner* — Kaying Kue
(74) *Attorney, Agent, or Firm* — Osler, Hoskin & Harcourt LLP

(57) ABSTRACT

A datum is created in an axle housing. A finished brake flange is welded to the axle housing with reference to the datum to make an axle sub-assembly. The axle sub-assembly is fixed to a first part of a machine. A finished spindle is supplied to a second part of the machine. The spindle is welded to the axle sub-assembly with reference to the datum. A dial indexing table is rotated to a first position. An axle is placed on the dial indexing table with its longitudinal axis oriented vertically. The dial indexing table is rotated to a second position, wherein the axle aligned with a CNC machine. A machining operation is performed on the axle with the CNC machine. The dial indexing table is rotated to a third position. The axle is removed from the dial indexing table. An axle and an apparatus for manufacturing an axle are described.

4 Claims, 16 Drawing Sheets

(56) References Cited

U.S. PATENT DOCUMENTS

| | | | |
|---|---|---|---|
| 4,921,159 A * | 5/1990 | Peck | 228/182 |
| 5,163,226 A * | 11/1992 | Phelps | 29/897.2 |
| 5,709,200 A * | 1/1998 | Mertes | 125/13.01 |
| 6,138,357 A * | 10/2000 | Jones | 29/897.2 |
| 6,412,879 B1 * | 7/2002 | Ogoniek et al. | 301/125 |
| 6,609,649 B1 * | 8/2003 | Barnholt et al. | 228/171 |
| 7,137,183 B2 | 11/2006 | Stuart et al. | |
| 7,240,571 B2 * | 7/2007 | Walker | 73/862.627 |
| 7,325,821 B2 * | 2/2008 | Myers et al. | 280/124.156 |
| 7,461,454 B2 * | 12/2008 | Melton et al. | 29/897.2 |
| 7,681,426 B2 | 3/2010 | Main et al. | |
| 8,109,000 B2 * | 2/2012 | Zalanca et al. | 29/897.2 |
| 2006/0143893 A1 * | 7/2006 | Ebert | 29/402.01 |
| 2006/0158023 A1 * | 7/2006 | Gottschalk et al. | 301/127 |
| 2007/0132307 A1 | 6/2007 | Fahrentholz et al. | |

\* cited by examiner

METHOD AND APPARATUS FOR MANUFACTURING AN AXLE FOR A VEHICLE

FIELD OF THE INVENTION

The present invention relates to a method and apparatus for manufacturing an axle for a vehicle.

BACKGROUND OF THE INVENTION

Referring to FIG. 1, an axle 10 for a truck or other vehicle is typically assembled in a series of welding and machining steps shown in FIG. 2A, beginning at step 100. At step 105, two housing halves 12 are welded together to form an axle housing. At step 110, a carrier ring 14 is welded to the housing. At step 115, a cover 16 is welded to the housing. At step 120, the ends 18 of the axle housing are machined. At step 125, rough spindles 20 are welded to the machined ends 18. At step 130, rough brake flanges 22 are welded to the machined ends 18. At step 135, the axle housing is straightened, to compensate for any distortion that may have occurred during the various welding steps. At step 140, brackets 24 are welded to the axle housing. At step 145, the ring 14 is machined, including drilling one or more holes (not shown) that act as datums or precise reference points for the machining and positioning of other parts of the axle 10. At step 150, the spindles 20 are machine finished, with reference to the datums. At step 155, the flanges 22 are machine finished, with reference to the datums, so that the finished spindles 20 and flanges 22 are precisely aligned relative to each other. This alignment must respect tolerances on the order of a few thousandths of an inch, so that the brake drum (not shown) that will be mounted on the spindle 20 will be properly aligned with the brake shoe (not shown) that will be mounted on the flange 22 when the axle 10 is installed in the vehicle. At step 160, additional operations may optionally be performed on the finished axle, such as load testing of the welds, washing, painting and packing the axle for shipping. The process ends at step 165.

While this process is adequate for producing axles, it has a number of drawbacks. The multiple welding operations impart a large quantity of heat to the parts, resulting in distortion and possible misalignment of the spindles 20 and flanges 22. This distortion can be partially compensated for by straightening the axle 10 at step 120. However, the straightening operation causes metal fatigue and reduces the useful lifetime of the axle 10.

The distortion can also be partially compensated for by finishing the spindles 20 and flanges 22 after the welding operations are complete, based on the location of the datums. While this produces a satisfactory alignment between the parts, it is difficult to manipulate the fully-assembled axle in order to machine the spindles 20 and flanges 22, due to the large size and weight of the assembled axle 10. In particular, the mass of the cover is offset from the longitudinal axis of the axle 10, and causes the axle 10 to be unbalanced, making it even more difficult to manipulate and machine. In addition, machining a part as large as an assembled axle 10 requires a large amount of floor space, particularly when several machining operations are performed at several different stations within the assembly area, and the assembled axle is machined in a horizontal orientation, resulting in a high cost of manufacture. In addition, machining a large part requires large and expensive machinery, further adding to the cost of manufacture.

In addition, the added machining required to finish the spindles 20 and flanges 22 after the axle 10 is assembled results in increased manufacturing time, further increasing the cost of manufacture.

Therefore, there is a need for a method of manufacturing an axle that does not require straightening of the axle.

There is also a need for a method and apparatus for manufacturing an axle requiring a reduced amount of floor space.

SUMMARY OF THE INVENTION

It is an object of the present invention to ameliorate at least some of the inconveniences present in the prior art.

It is a further object of the present invention to provide a method and apparatus for manufacturing an axle that does not require machine finishing of the spindles and flanges after assembly.

It is a further object of the present invention to provide a method and apparatus for manufacturing an axle having precise alignment between the brake flanges and the spindles.

It is a further object of the present invention to provide a method and apparatus for manufacturing an axle having reduced cost.

It is a further object of the present invention to provide a method and apparatus for machining an axle with reference to one or more finished spindles or brake flanges.

In one aspect, the invention provides a method of manufacturing an axle. At least one datum is created in an axle housing. At least one brake flange is welded to the axle housing at least in part with reference to the at least one datum to form an axle sub-assembly. At least one spindle is welded to the axle sub-assembly at least in part with reference to the at least one datum.

In a further aspect, the at least one spindle is at least one finished spindle.

In a further aspect, the at least one brake flange is at least one finished brake flange.

In a further aspect, at least one bracket is welded to the axle housing at least in part with reference to the at least one datum, prior to welding the at least one finished brake flange to the axle housing.

In a further aspect, welding at least one finished spindle to the axle housing at least in part with reference to the at least one datum includes locating the at least one spindle on the axle housing at least in part with reference to a location of the at least one brake flange.

In a further aspect, at least one ring is welded to the axle housing prior to welding the at least one finished brake flange to the axle housing. The at least one ring is located on the axle housing at least in part with reference to the at least one datum.

In a further aspect, at least one cover is welded to the axle housing prior to welding the at least one finished brake flange to the axle housing. The at least one cover is located on the axle housing at least in part with reference to the at least one datum.

In a further aspect, the axle housing is not straightened after welding the at least one bracket to the axle housing.

In an additional aspect, the invention provides a method of manufacturing an axle. A dial indexing table is rotated to a first position. An axle is placed on the dial indexing table such that a longitudinal axis of the axle is oriented generally vertically. The dial indexing table is rotated to at least one second position, wherein the axle is in alignment with at least one CNC machine positioned around a periphery of the dial indexing table. At least one machining operation is performed on the axle with the at least one CNC machine while the longitudinal axis of the axle is oriented generally vertically. The dial indexing table is rotated to a third position. The axle is removed from the dial indexing table when the dial indexing table is in the third position.

In a further aspect, the third position is the same as the first position.

In a further aspect, placing the axle on the dial indexing table such that the longitudinal axis of the axle is oriented generally vertically includes holding the axle in position on the dial indexing table by at least one spindle of the axle.

In a further aspect, the at least one spindle is at least one finished spindle.

In a further aspect, placing the axle on the dial indexing table such that the longitudinal axis of the axle is oriented vertically includes holding the axle in position by at least one brake flange of the axle.

In a further aspect, the at least one brake flange is at least one finished brake flange.

In a further aspect, the at least one machining operation includes at least one machining operation performed on an interior of the axle.

In a further aspect, the at least one machining operation is performed on a portion of the axle other than at least one brake flange and at least one spindle of the axle.

In an additional aspect, the invention provides an apparatus for machining an axle, comprising a dial indexing table. The dial indexing table is rotatable between a first position and at least one second position. The dial indexing table is adapted to receive the at least one axle when in the first position such that a longitudinal axis of the at least one axle is oriented vertically. At least one CNC machine is positioned around a periphery of the dial indexing table. The at least one CNC machine is adapted to perform at least one machining operation on the at least one axle when the dial indexing table is in the at least one second position.

In a further aspect, the dial indexing table is capable of receiving the at least one axle by receiving at least one finished part of the axle.

In a further aspect, the at least one finished part of the axle is at least one finished spindle.

In a further aspect, the at least one CNC machine is adapted to perform the at least one machining operation on the at least one axle while the longitudinal axis of the at least one axle is oriented vertically.

In a further aspect, the at least one machining operation is performed on a portion of the axle other than at least one brake flange and at least one spindle of the axle.

In an additional aspect, the invention provides a method of manufacturing an axle. An axle sub-assembly is fixed to a first part of a machine. A first spindle is supplied to a second part of the machine. The first part is moved toward the second part with a first end of the axle sub-assembly facing the second part. The first spindle is welded to a first end of the axle sub-assembly when the first part is moved toward the second part. The first part is moved away from the second part after welding the first spindle to the first end of the axle sub-assembly. The first part is rotated about an axis generally perpendicular to a longitudinal axis of the axle sub-assembly while maintaining the axle sub-assembly and the first spindle in position relative to the first part, such that a second end of the axle sub-assembly faces the second part. A second spindle is supplied to the second part. The first part is moved toward the second part. The second spindle is welded to the second end of the axle sub-assembly when the first part is moved toward the second part.

In a further aspect, welding the first spindle to the first end of the axle sub-assembly includes rotating the first spindle about a longitudinal axis of the first spindle. Welding the second spindle to the second end of the axle sub-assembly includes rotating the second spindle about a longitudinal axis of the second spindle.

In a further aspect, fixing the axle sub-assembly to the first part includes positioning the axle sub-assembly relative to the first part at least in part based on one or more datums of the axle sub-assembly. Welding the first spindle to the first end of the axle sub-assembly includes positioning the first spindle relative to the axle sub-assembly at least in part based on the one or more datums. Welding the second spindle to the second end of the axle sub-assembly includes positioning the second spindle relative to the axle sub-assembly at least in part based on the one or more datums.

In a further aspect, positioning the axle sub-assembly relative to the first part at least in part based on one or more datums of the axle sub-assembly includes locating the axle sub-assembly relative to a finished part of the axle sub-assembly.

In an additional aspect, the finished part of the axle sub-assembly is a finished brake flange In an additional aspect, the invention provides a machine for welding an axle. The machine comprises a first part and a second part. The first part is movable with respect to the second part. The first part has a first end and a second end. The first part is adapted to receive an axle sub-assembly having a longitudinal axis. The first part is adapted to fix the axle sub-assembly in position relative thereto such that a first end of the axle sub-assembly is oriented toward the first end of the first part, and a second end of the axle sub-assembly is oriented toward the second end of the first part. The first part is rotatable relative to the second part about a first axis generally perpendicular to the longitudinal axis. The second part is adapted to receive a spindle. The second part is rotatable relative to the first part about a second axis generally coaxial to a longitudinal axis of the spindle. When the first part receives the axle sub-assembly with the first end of the axle sub-assembly facing the second part, and the second part receives a first spindle, rotating the second part about the second axis causes the first spindle to be welded to the first end of the axle sub-assembly. When the first part is rotated about the first axis by approximately 180 degrees while maintaining the axle sub-assembly fixed in position relative to the first part such that the second end of the axle sub-assembly is facing the second part, and the second part receives a second spindle, rotating the second part about the second axis causes the second spindle to be welded to a second end of the axle sub-assembly.

In a further aspect, the first part is adapted to fix the axle sub-assembly in position relative thereto at least in part based on one or more datums of the axle sub-assembly.

In a further aspect, the first part includes one or more recesses adapted to receive one or more brake flanges of the axle sub-assembly to fix the one or more brake flanges in position relative to the first part.

In a further aspect, the second part is adapted to receive a finished spindle.

In an additional aspect, the invention provides a method of manufacturing an axle. An axle sub-assembly is fixed to a first part of a machine such that the axle sub-assembly is positioned relative to the first part at least in part based on a position of one or more datums of the axle sub-assembly. A first spindle is supplied to at least one second part of the machine. The at least one second part is moved relative to the first part with a first end of the axle sub-assembly facing the at least one second part, such that the at least one second part is aligned with the first part. The first spindle is welded to the first end of the axle sub-assembly when the at least one second part is moved toward the first part. The at least one second part is moved away from the first part after welding the first spindle to the first end of the axle sub-assembly. A second spindle is supplied to the at least one second part of the machine. The at least one second part is moved relative to the first part with a second end of the axle sub-assembly facing the at least one second part, such that the at least one second part is aligned with the first part. The second spindle is welded to the second end of the axle sub-assembly when the at least one second part is moved toward the first part. The at least one second part is moved away from the first part after welding the second spindle to the second end of the axle sub-assembly. The axle sub-assembly is released from the first part of the machine after welding the first and second spindles.

In a further aspect, fixing the axle sub-assembly to the first part of the machine such that the axle sub-assembly is positioned relative to the first part at least in part based on the position of one or more datums of the axle sub-assembly includes fixing the axle sub-assembly to the first part of the machine such that the axle sub-assembly is positioned relative to the first part at least in part based on the position of one or more finished brake flanges of the axle sub-assembly.

In a further aspect, welding the first spindle to the first end of the axle sub-assembly includes rotating a first spindle about the longitudinal axis of the first spindle. Welding the second spindle to the second end of the axle sub-assembly includes rotating the second spindle about a longitudinal axis of the second spindle.

In a further aspect, welding the first spindle to the first end of the axle sub-assembly includes positioning the first spindle relative to the axle sub-assembly at least in part based on the position of the one or more finished brake flanges. Welding the second spindle to the second end of the axle sub-assembly includes positioning the second spindle relative to the axle sub-assembly at least in part based on the position of the one or more finished brake flanges.

In a further aspect, supplying a first spindle to at least one second part of the machine and supplying a second spindle to the at least one second part of the machine includes: supplying the first spindle to one second part of the machine on a first side of the first part of the machine; and supplying the second spindle to another second part of the machine on a second side of the first part of the machine opposite the first side.

In a further aspect, welding the second spindle to the second end of the axle sub-assembly when the at least one second part is moved toward the first part includes welding the second spindle to the second end of the axle sub-assembly while welding the first spindle to the first end of the axle sub-assembly.

In a further aspect, welding the first spindle to the first end of the axle sub-assembly includes rotating the first spindle about a longitudinal axis of the first spindle. Welding the second spindle to the second end of the axle sub-assembly includes rotating the second spindle about a longitudinal axis of the second spindle.

In a further aspect, welding the first spindle to the first end of the axle sub-assembly includes positioning the first spindle relative to the axle sub-assembly at least in part based on the position of one or more finished brake flanges. Welding the second spindle to the second end of the axle sub-assembly includes positioning the second spindle relative to the axle sub-assembly at least in part based on the position of the one or more finished brake flanges.

In an additional aspect, the invention provides a machine for welding an axle. The machine comprises a first part and at least one second part. The at least one second part is movable with respect to the first part. The first part has a first end and a second end. The first part is adapted to receive an axle sub-assembly having a longitudinal axis. The first part is adapted to fix the axle sub-assembly in position relative thereto such that a first end of the axle sub-assembly is oriented toward the first end of the first part, and a second end of the axle sub-assembly is oriented toward the second end of the first part. The at least one second part is adapted to receive at least one spindle. The at least one second part is rotatable relative to the first part about a second axis generally coaxial to a longitudinal axis of the spindle. When the first part receives the axle sub-assembly with the first end of the axle sub-assembly facing the at least one second part, the at least one second part is moved toward the first part, and the at least one second part receives a first spindle, rotating the at least one second part about the second axis causes the first spindle to be welded to the first end of the axle sub-assembly. When the second end of the axle sub-assembly is facing the at least one second part, the at least one second part is moved toward the first part, and the at least one second part receives a second spindle, rotating the at least one second part about the second axis causes the second spindle to be welded to a second end of the axle sub-assembly.

In a further aspect, the first part is adapted to fix the axle sub-assembly in position relative thereto at least in part based on one or more datums of the axle sub-assembly.

In a further aspect, the first part includes one or more recesses adapted to receive one or more brake flanges of the axle sub-assembly to fix the one or more brake flanges in position relative to the first part.

In a further aspect, the one or more datums of the axle sub-assembly are one or more finished surfaces of at least one brake flange of the axle sub-assembly.

In a further aspect, the at least one second part is two second parts. One of the two second parts receives the first spindle. The other of the two second parts receives the second spindle. The first part is disposed between the two second parts. Rotating the two second parts about the second axis causes the first and second spindle to be welded to the respective first and second ends of the axle sub-assembly concurrently.

In a further aspect, the first and second spindles are first and second finished spindles. Rotating the two second parts about the second axis causes the first and second spindle to be welded to the respective first and second ends of the axle sub-assembly such that the first and second finished spindles are aligned relative to the one or more datums after welding.

For purposes of this application, the term "datum" means any feature of a part that serves as a precise reference location for the attachment or machining of another part.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Figure 1:
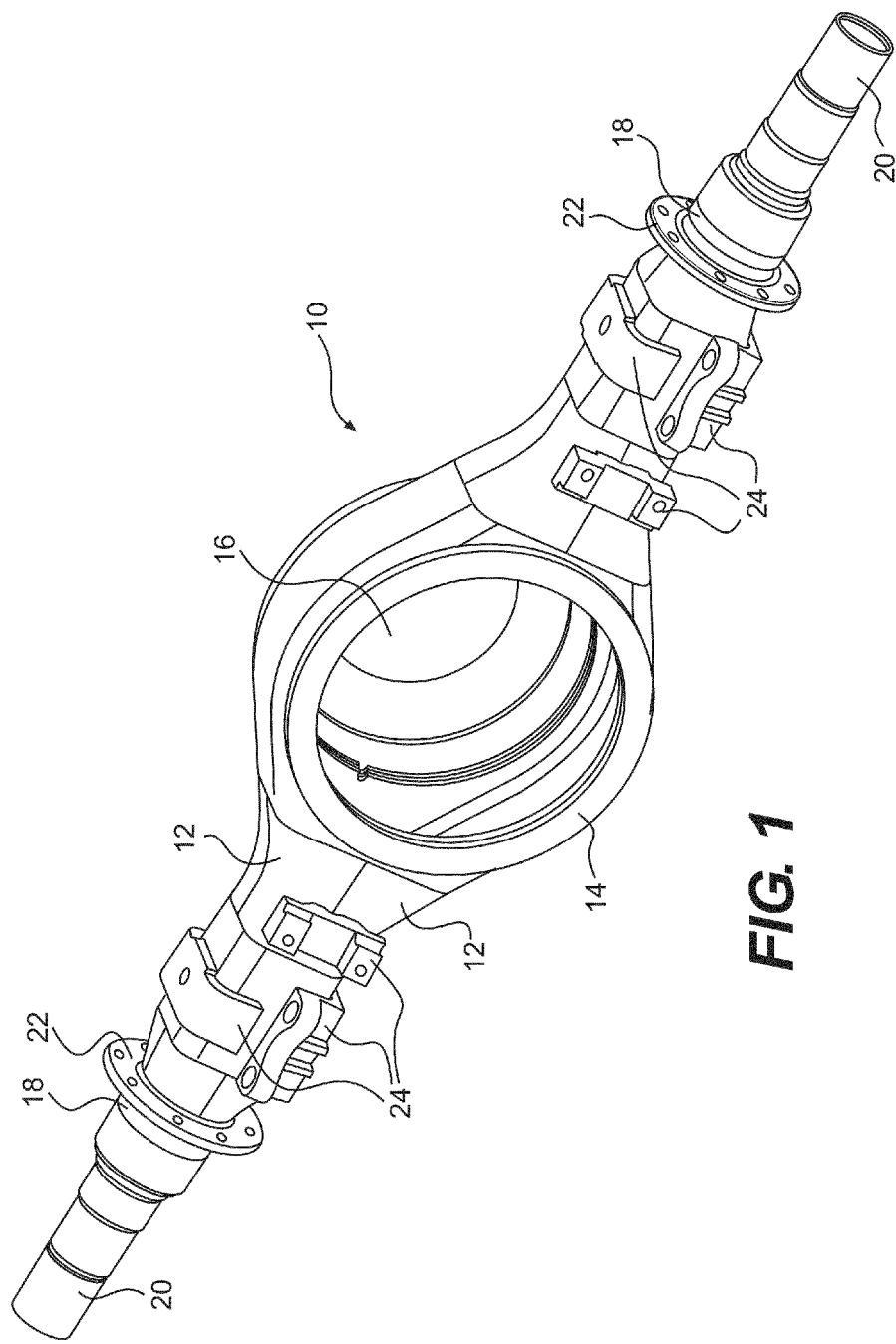
FIG. 1 is a front left perspective view of a vehicle axle.
Figure 2A:
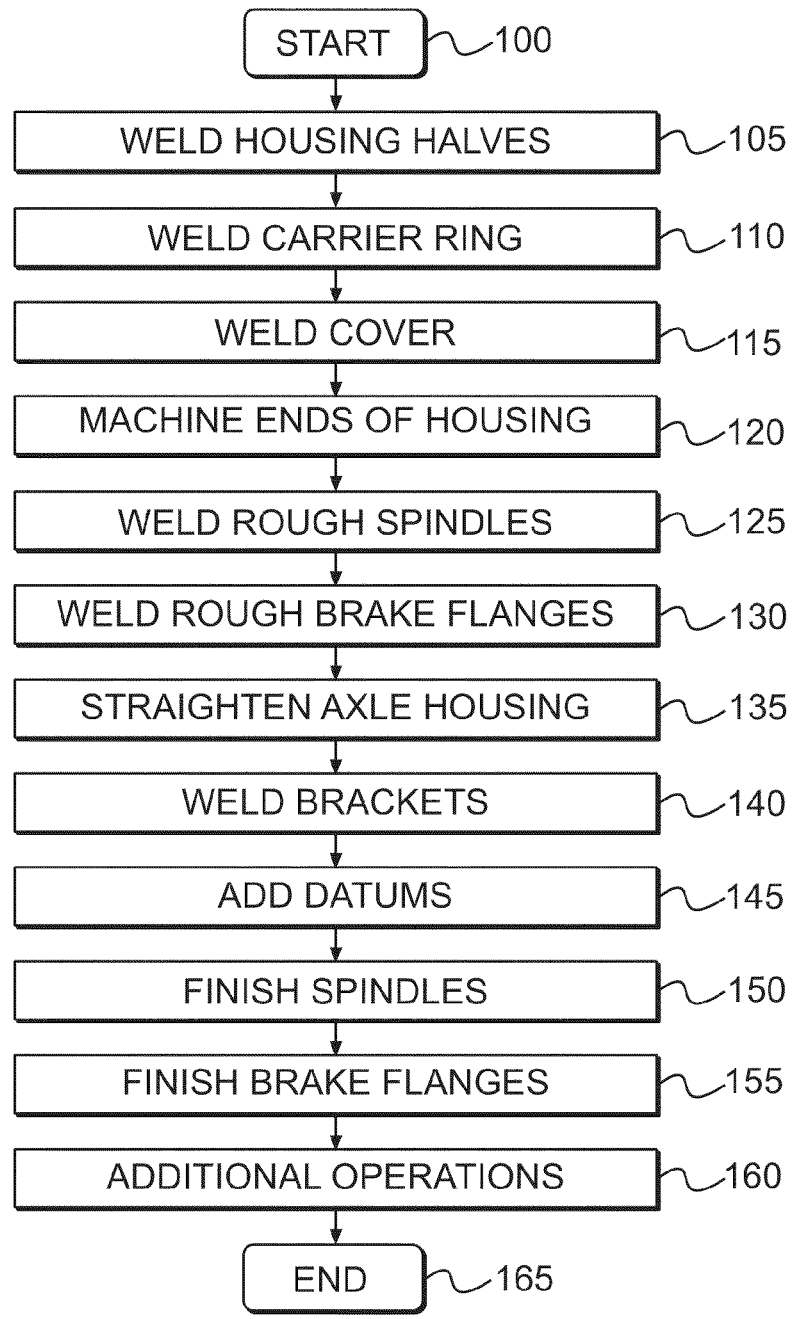
FIG. 2A is a logic diagram of a prior art assembly process for an axle.
Figure 2B:
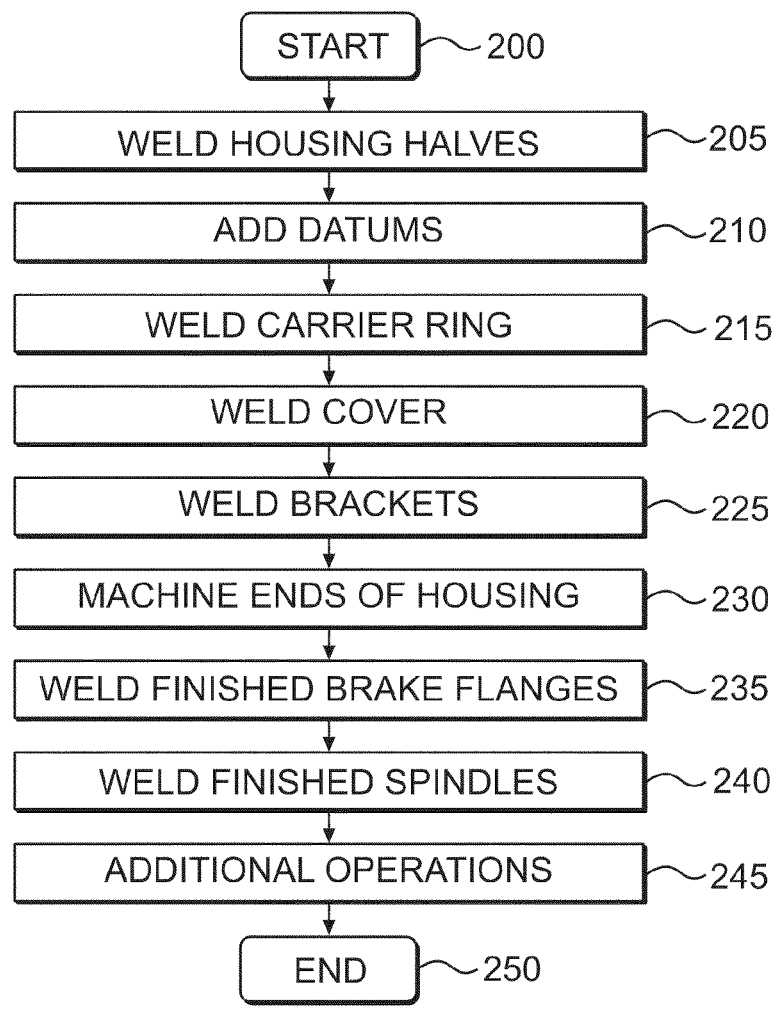
FIG. 2B is a logic diagram of an assembly process for an axle according to the invention.

Referring to FIG. 2B, a process of assembling the axle 10 as shown in FIG. 1 will be described. The finished axle 10 according to this process is necessarily similar in outward appearance to the axle 10 according to the prior art process, because it is designed to be attached to the same vehicle via the same brackets, to perform the same function in cooperation with surrounding components of the vehicle. However, it should be understood in view of the present specification that the process described below results in cost savings as well as improved quality and useful life of the axle 10. The process begins at step 200.

Figure 3:
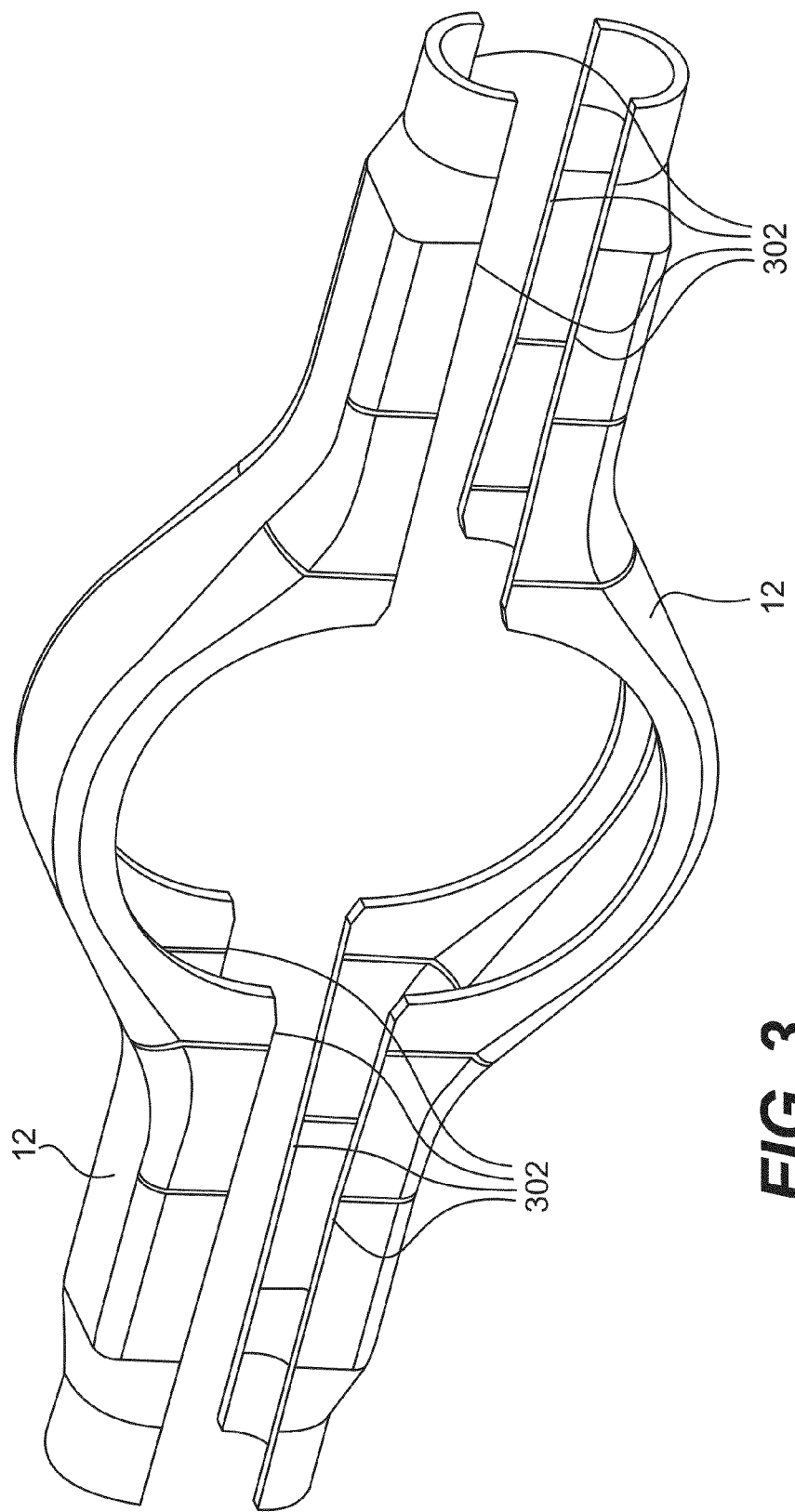
FIG. 3 is a front left perspective view of the assembly of the axle housing of the axle of FIG. 1.
Figure 4:
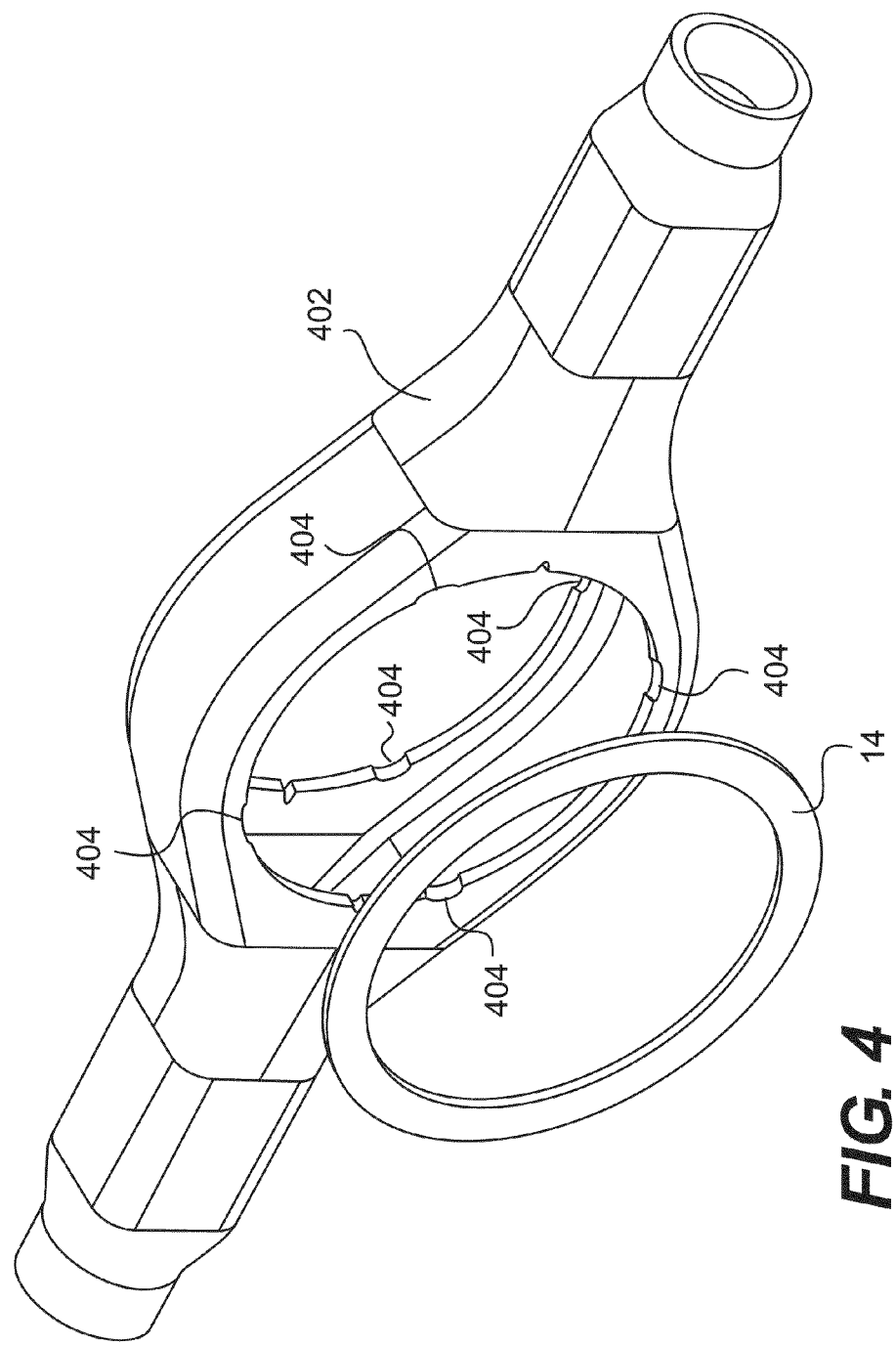
FIG. 4 is a front left perspective view of the assembly of a carrier ring onto the assembled axle housing of FIG. 3.
Figure 5:
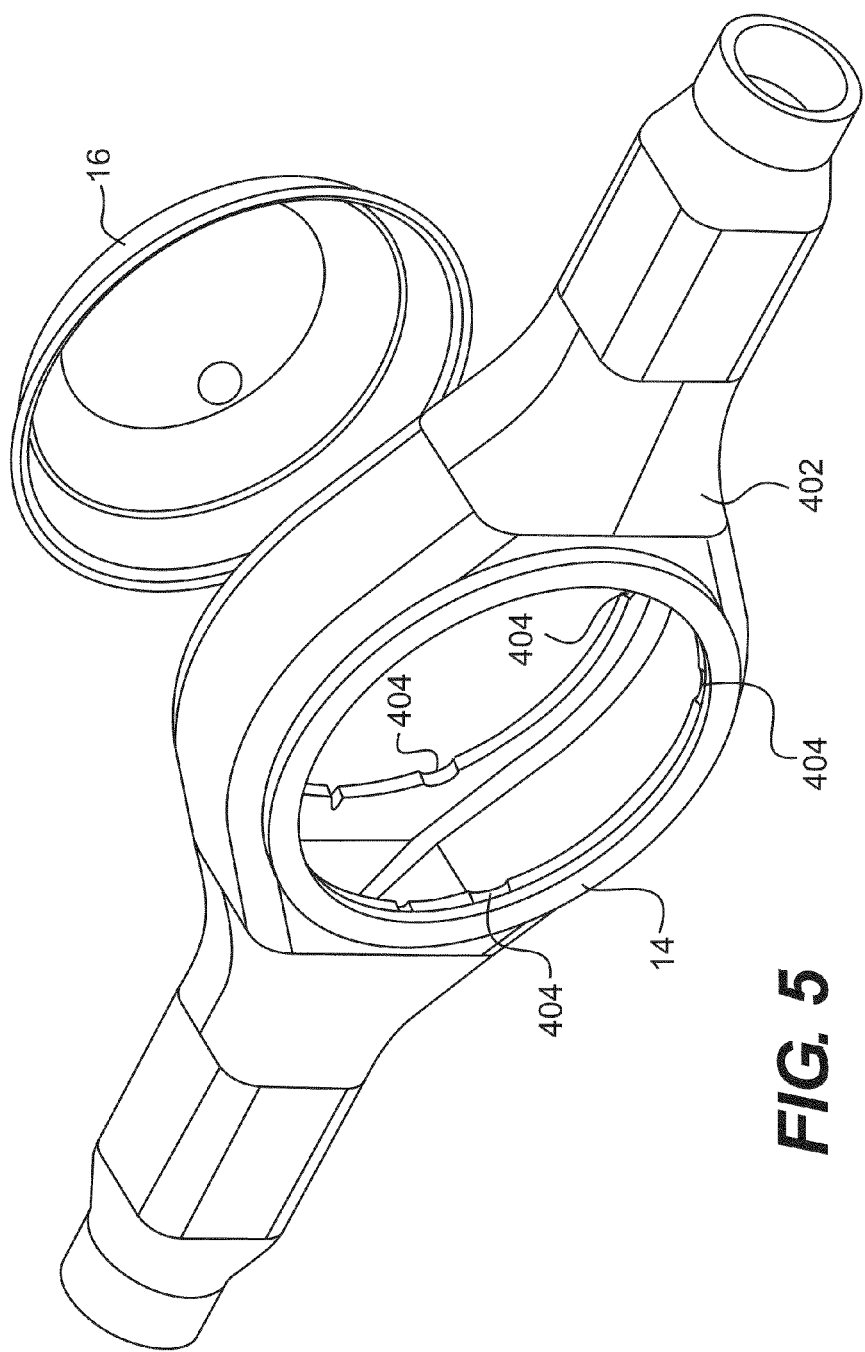
FIG. 5 is a front left perspective view of the assembly of a cover onto the assembled axle housing of FIG. 4.
Figure 6:
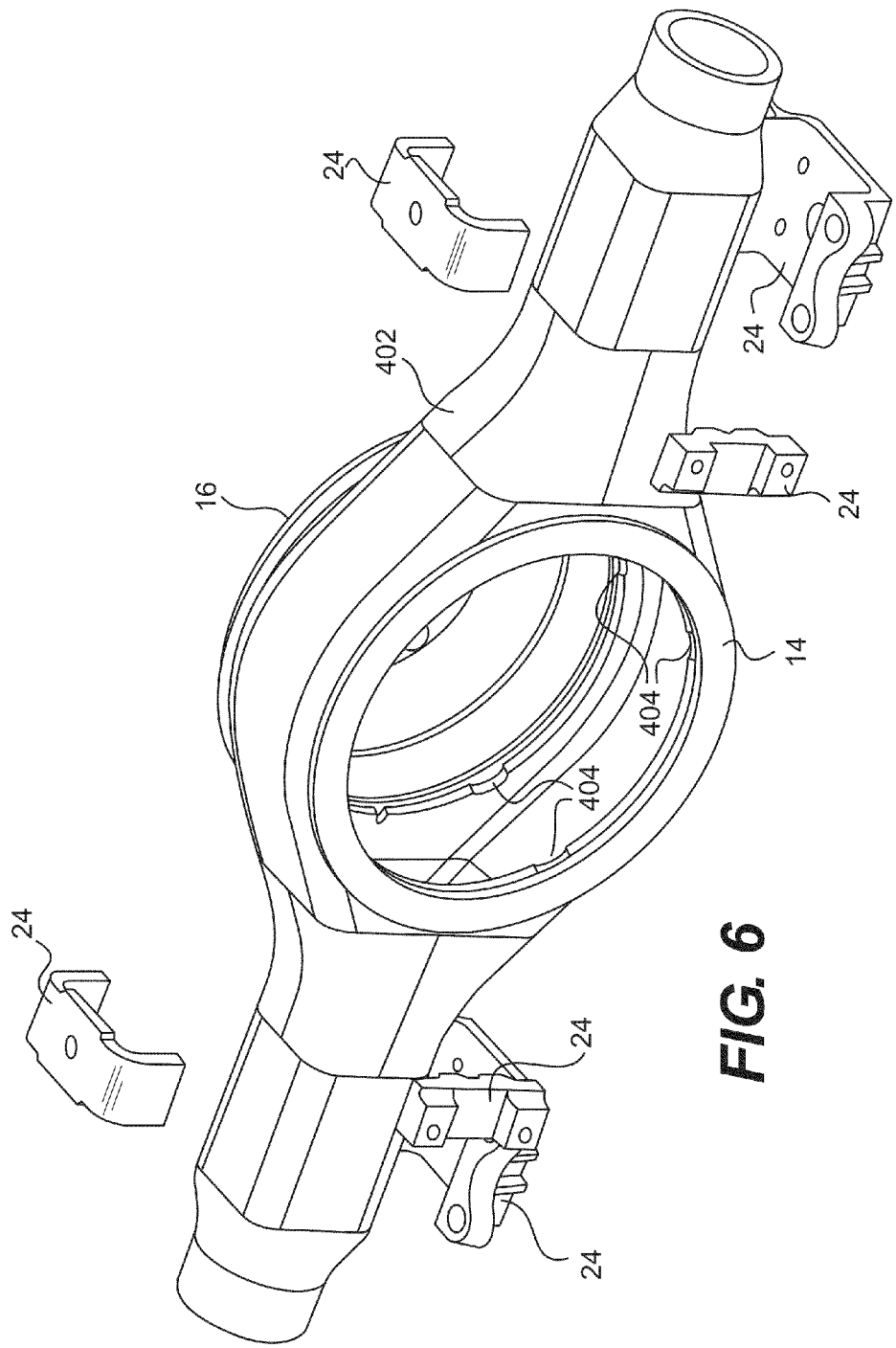
FIG. 6 is a front left perspective view of the assembly of brackets onto the assembled axle housing of FIG. 5.

At step 205, two axle halves 12 (FIG. 3) are clamped together and welded together along the edges 302, to form an axle housing 402 (FIG. 4). This can be done using any conventional welding method, as would be understood by a person skilled in the art. As would be understood, the heat generated by this welding step may cause varying degrees of distortion of the axle housing 402, depending on the type of welding used.

At step 210, eight datums 404 (some of which can be seen in FIGS. 4-8) in the form of scalloped recesses are machined into the axle housing 402. The size of the datums 404 has been exaggerated in the drawings to make them more visible. The datums 404 serve as reference locations on the axle housing 402, so that subsequent welding and machining operations can be located on the axle housing 402 relative to the location of the datums 404. As a result, the features of the finished axle 10 will be precisely aligned relative to each other. It is contemplated that any other form of datum known in the art may alternatively be used, and that the number of datums may be more or fewer than the number shown. It is also contemplated that the datums 404 could also be created by processes other than machining such as stamping for example. The datums 404 can be machined using any conventional means, such as a CNC machine. Machining the datums 404 at this early stage of assembly allows subsequent steps to be performed with high precision, as will be described below.

At step 215, a carrier ring 14 (FIG. 4) is welded to the axle housing 402. This can be done using any conventional welding method, as would be understood by a person skilled in the art. The carrier ring 14 is precisely located on the axle housing 402 by using the datums 404 as a reference.

At step 220, a cover 16 (FIG. 6) is welded to the axle housing 402. This can be done using any conventional welding method, as would be understood by a person skilled in the art. The cover 16 is precisely located on the axle housing 402 by using the datums 404 as a reference.

Figure 7:
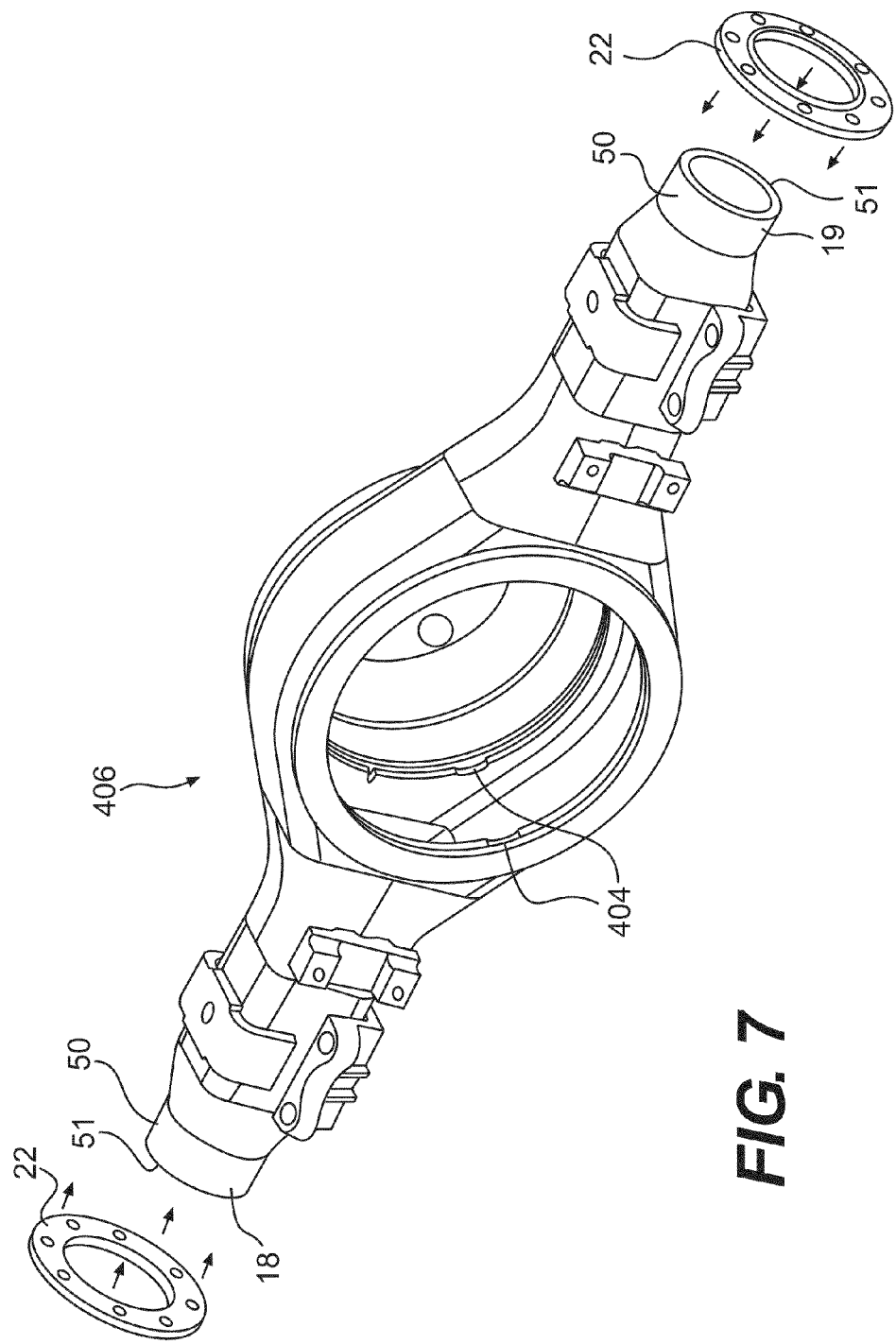
FIG. 7 is a front left perspective view of the assembly of brake flanges onto the axle sub-assembly of FIG. 6.
Figure 8:
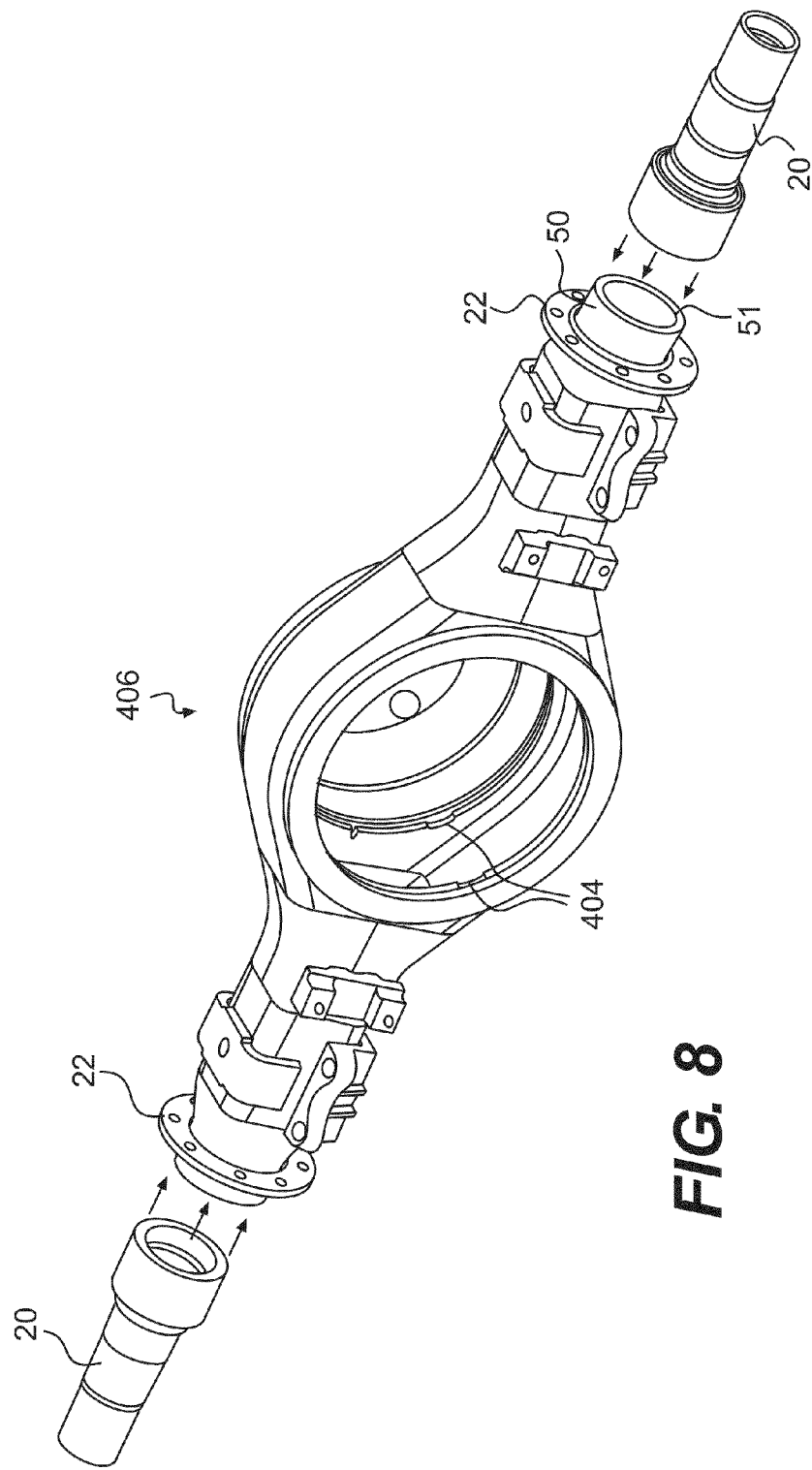
FIG. 8 is a front left perspective view of the assembly of spindles onto the axle sub-assembly of FIG. 7.

At step 225, various brackets 24 (FIG. 6) are precisely positioned on the axle housing 402 relative to the datums 404, and are welded to the axle housing 402 to form an axle sub-assembly 406 (FIG. 7). The number, size, shape and position of the brackets 24 depends on the number, size, shape and position of the attachment points on the vehicle to which the axle 10 will be attached. As would be understood, the heat generated by this welding step may cause varying degrees of distortion of the axle housing 402, depending on the number and size of brackets 24 and the type of welding used. Unlike conventional methods, this distortion occurs before the spindles 20 (FIG. 8) and brake flanges 22 (FIG. 7) are connected to the axle sub-assembly 406. As a result, any distortion that occurs does not affect the relative positioning of the spindles 20 and the brake flanges 22. The brackets 24 are precisely located on the axle housing 402 by using the datums 404 as a reference. The brackets 24 allow the finished axle 10 to be attached to surrounding components of the vehicle. It is contemplated that step 225 may be omitted, for example if a purchaser desires an axle without brackets so that its own brackets could be attached at a later time.

At step 230, the circumference 50 and the extremities 51 of both ends 18, 19 of the axle sub-assembly 406 are machine finished in preparation for the attachment of the flanges 22 to the circumference 50 of both ends 18, 19 and the attachment of the spindles 20 to the extremities 51 of both ends 18, 19. This machining is done by using the datums 404 as a reference, so that the spindles 20 and flanges 22, when attached, will be properly aligned and in their precise locations, irrespective of any distortion that may have been caused by previous welding operations. This results in increased precision compared to conventional methods wherein datums are machined only after the ends 18, 19 are machined.

At step 235, finished brake flanges 22 (FIG. 7) are welded to the axle sub-assembly 406 in their precise location. Unlike the conventional practice of attaching rough brake flanges 22 and later finishing (see steps 130 and 155 of FIG. 2A), the brake flanges 22 are machine finished before being welded to the axle sub-assembly 406, such that they require no further machining after they are welded. However, it should be understood that some machining could nonetheless be performed on the brake flanges 22 after being welded to the axle sub-assembly 406. The brake flanges 22 are precisely positioned by using the datums 404 as a reference, so that they are correctly positioned without the need for further machining.

At step 240, finished spindles 20 (FIG. 8) are welded to the machined extremities 51 of the axle sub-assembly 406. Unlike the conventional practice of attaching rough brake spindles 20 and later finishing them (see steps 125 and 150 of FIG. 2A), the spindles 20 are machine finished before being welded to the axle sub-assembly 406, such that they require no further machining after they are welded. In this manner, the spindles 20 can be finished using smaller and less expensive machinery because they can be manipulated individually and without an axle sub-assembly attached thereto. In addition, the total assembly time of the finished axle can be reduced because the number of machining steps required during the assembly process is reduced.

Referring to FIGS. 9A-9E, an apparatus 900 for welding the spindles 20 to the axle sub-assembly 406 will now be described according to a first embodiment.

Figure 9A:
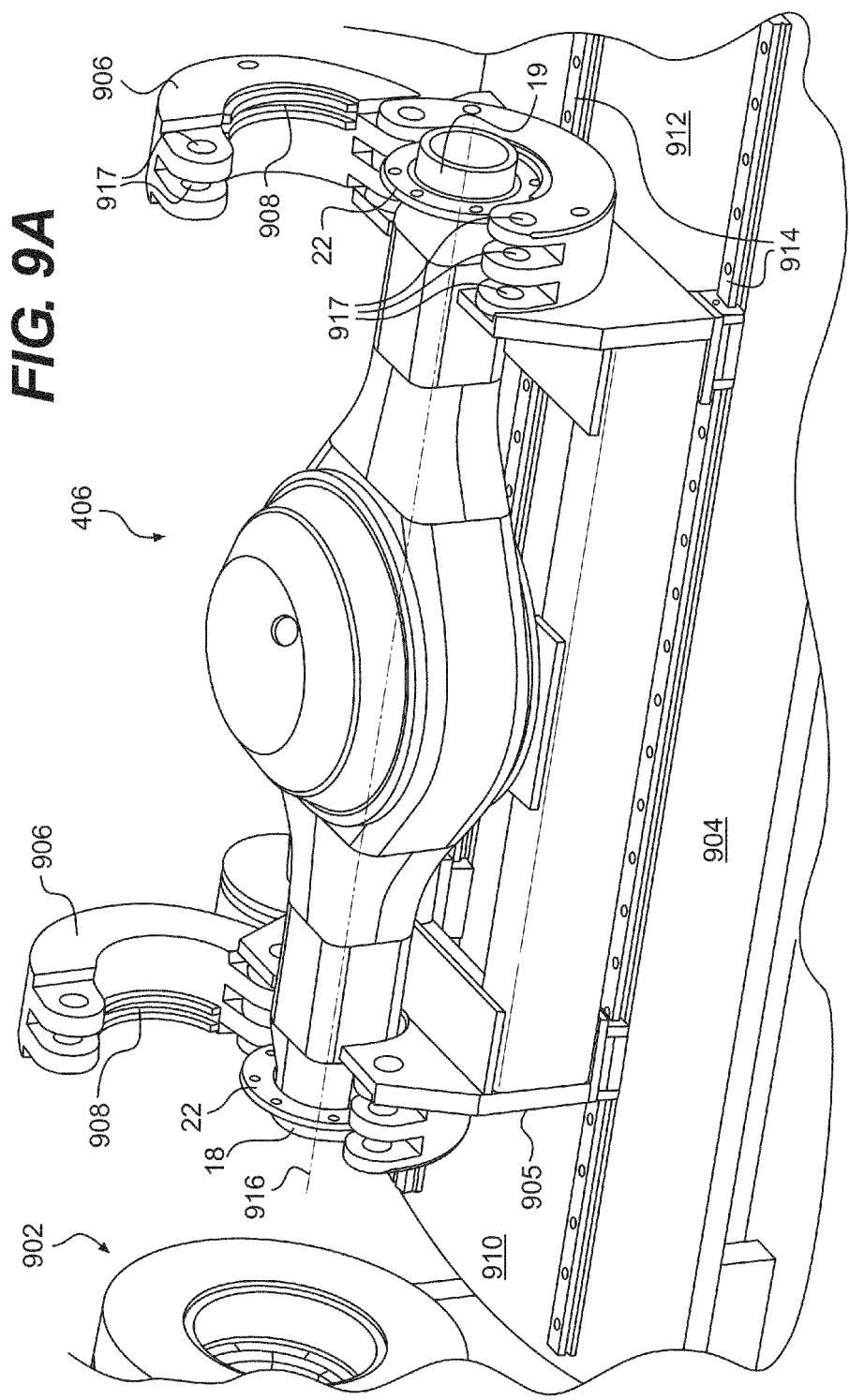
FIG. 9A is a front perspective view of the axle sub-assembly of FIG. 7 being mounted onto an apparatus according to a first embodiment for assembling the spindles to the axle sub-assembly.
Figure 9B:
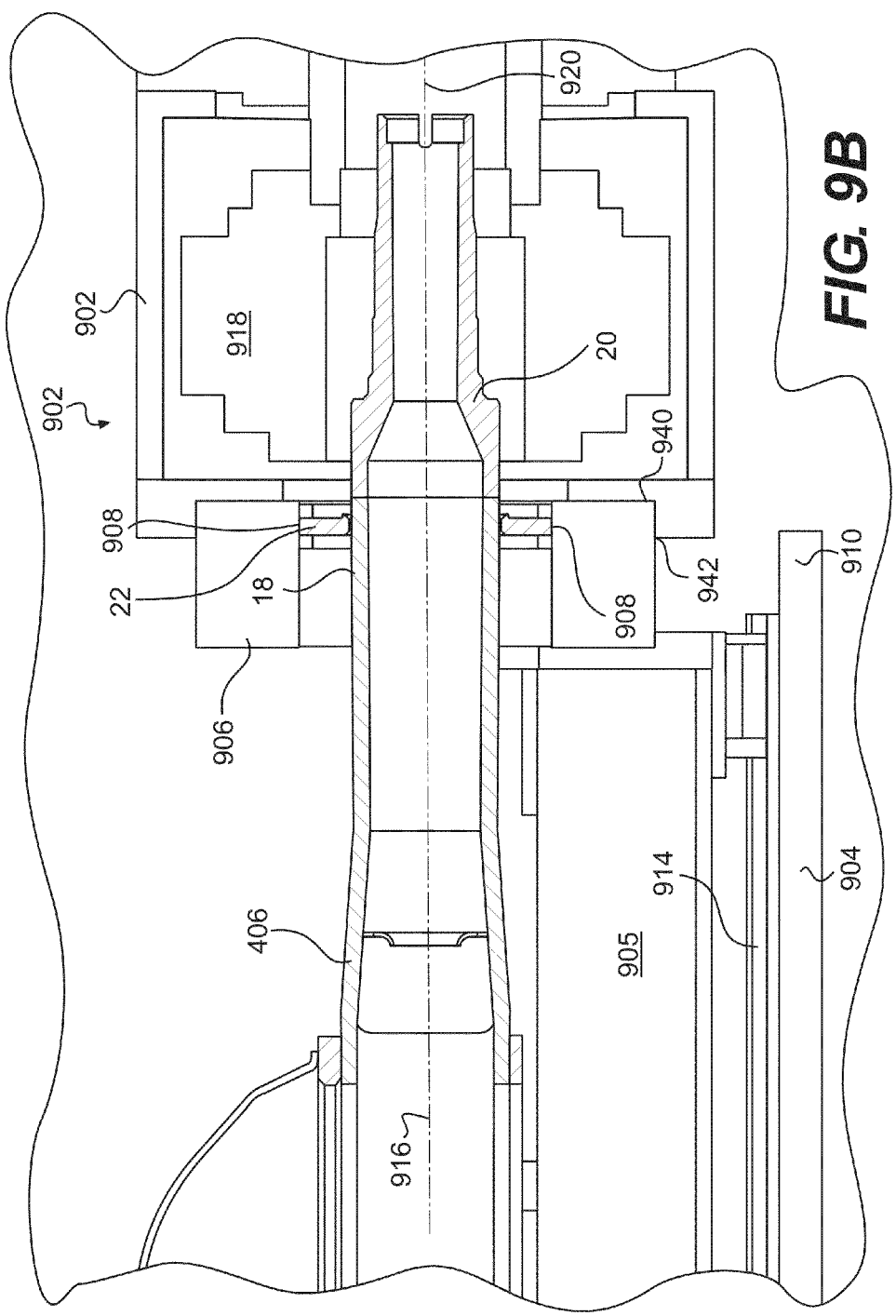
FIG. 9B is a cross-sectional view of a portion of the axle sub-assembly of FIG. 7 aligned with a spindle for assembly.
Figure 9C:
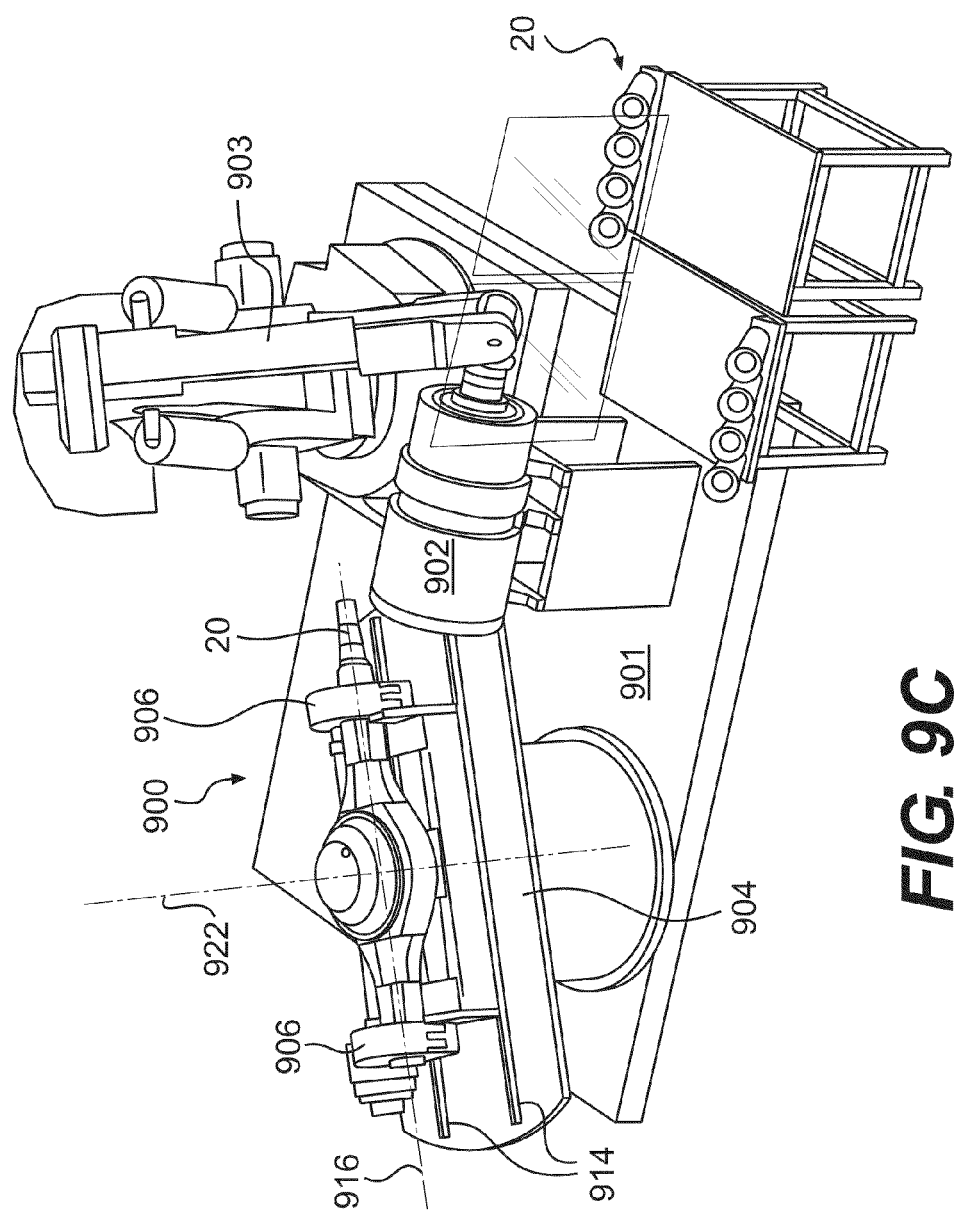
FIGS. 9C-9E are front perspective views of a complete apparatus for assembling the spindles to the axle sub-assembly of FIG. 7 according to a first embodiment.

Referring to FIG. 9C, the apparatus 900 consists of a welding machine 902, a turntable 904 and a robotic arm 903, all mounted to a platform 901 such that their coordinates relative to each other are fixed.

Referring to FIG. 9A, the turntable 904 includes a jig 905 extending along the length of the turntable 904. The jig 905 is adapted to receive and hold the axle sub-assembly 406 in a precise position relative to the datums 404. The jig 905 is mounted to tracks 914 also extending along the length of the turntable 904 that allow the axle sub-assembly 406 to be moved back and forth along its longitudinal axis 916. It is contemplated that the jig 905 may alternately be fixed in position, in which case the welding machine 902 would be mounted to tracks to allow the welding machine 902 to move back and forth along the axis 920. The jig 905 includes a pair of clamping brackets 906 adapted to receive the ends 18, 19 of the axle sub-assembly 406. Slots 908 in the clamping brackets 906 are shaped and positioned to receive the brake flanges 22 and accurately position the axle sub-assembly 406 relative to the turntable 904 and therefore relative to the welding machine 902. As a result, the axle sub-assembly 406 is positioned with high precision by using the brake flanges 22 as a reference, and thereby indirectly using the datums 404 as a reference, so that the spindles 20 will be correctly positioned relative to the brake flanges 22 without the need for further machining. The jig 905 of the turntable 904 receives the axle sub-assembly 406 such that the first end 18 of the axle sub-assembly 406 is oriented toward a first end 910 of the turntable 904, and the second end 19 of the axle sub-assembly 406 is oriented toward a second end 912 of the turntable 904. Thereafter, the clamping brackets 906 are closed over the ends 18, 19 of the axle sub-assembly 406 and are locked over the brake flanges 22 by inserting a rod (not shown) through the apertures 917 in the clamping brackets 906.

Referring back to FIG. 9C, the robotic arm 903 inserts a finished spindle 20 into the welding machine 902. Referring to FIG. 9B, the welding machine 902 receives and holds the finished spindle 20 about a spin welding axis 920 which is coaxial to the longitudinal axis 916 of the axle sub-assembly 406 when the latter is held within the jig 905 and the turntable 904 is oriented with either end 18, 19 of the axle sub-assembly 406 in the direction of the welding machine 902. After receiving the axle sub-assembly 406, the turntable 904 is rotated until the longitudinal axis 916 of the axle sub-assembly 406 is coaxial with the spin welding axis 920 and the jig 905 is moved along the tracks 914 toward the welding machine 902 by the action of the endless screw 944 which is connected to the jig 905 via a bracket 946 and powered by a step motor 948 (FIG. 9E) until the clamping bracket 906 abuts against the wall 940 of a receiving portion 942 of the welding machine 902. As illustrated, the wall 940 of the receiving portion 942 is precisely aligned with the end 21 of the spindle 20 while the sidewall 907 of the clamping bracket 906 is precisely aligned with the extremity 51 of the end 18 of the axle sub-assembly 406. The finished spindle 20 is therefore precisely aligned with the brake flange 22 on the first end 18 by way of the sidewall 907 of the clamping bracket 906 and abuts with the extremity 51 of the end 18 of the axle sub-assembly 406.

A rotatable part 918 of the welding machine 902 grips the finished spindle 20 and rotates the spindle 20 against the extremity 51 of the end 18 about the spin welding axis 920 to weld the finished spindle 20 to the axle sub-assembly 406 in a known manner. It is contemplated that the spindle 20 could be welded to the axle sub-assembly 406 without having to rotate the spindle 20 by a full turn. This spin welding process does not produce significant distortion of the metal parts, thereby allowing the use of finished spindles 20 that require no further machining after being welded to the axle sub-assembly 406. Examples of contemplated welding processes include, but are not limited to, friction welding and spinduction welding.

In an embodiment of the present invention, the rotatable part 918 (and associated parts thereof) is pivotable such that the spin welding axis 920 can be disposed at an angle to the longitudinal axis 916 of the axle sub-assembly 406 when the axle sub-assembly is held within the jig 905 and the turntable 904 is oriented with either end 18, 19 of the axle sub-assembly 406 in the direction of the welding machine 902. This allows the finished spindle 20 to be welded to the axle sub-assembly 406 with a predetermined amount of camber and/or toe. In order to permit the finished spindle 20 to be welded to the axle sub-assembly 406 in this manner, at step 230 described above, the circumference 50 and the extremities 51 of both ends 18, 19 of the axle sub-assembly 406 are machine finished at an angle corresponding to the desired predetermined amount of camber and/or toe. As would be understood, by providing the correct amount of camber and/or toe on the finished axle 10, a vehicle having the finished axle will have improved fuel economy and handling and more even tire wear.

Figure 9D:
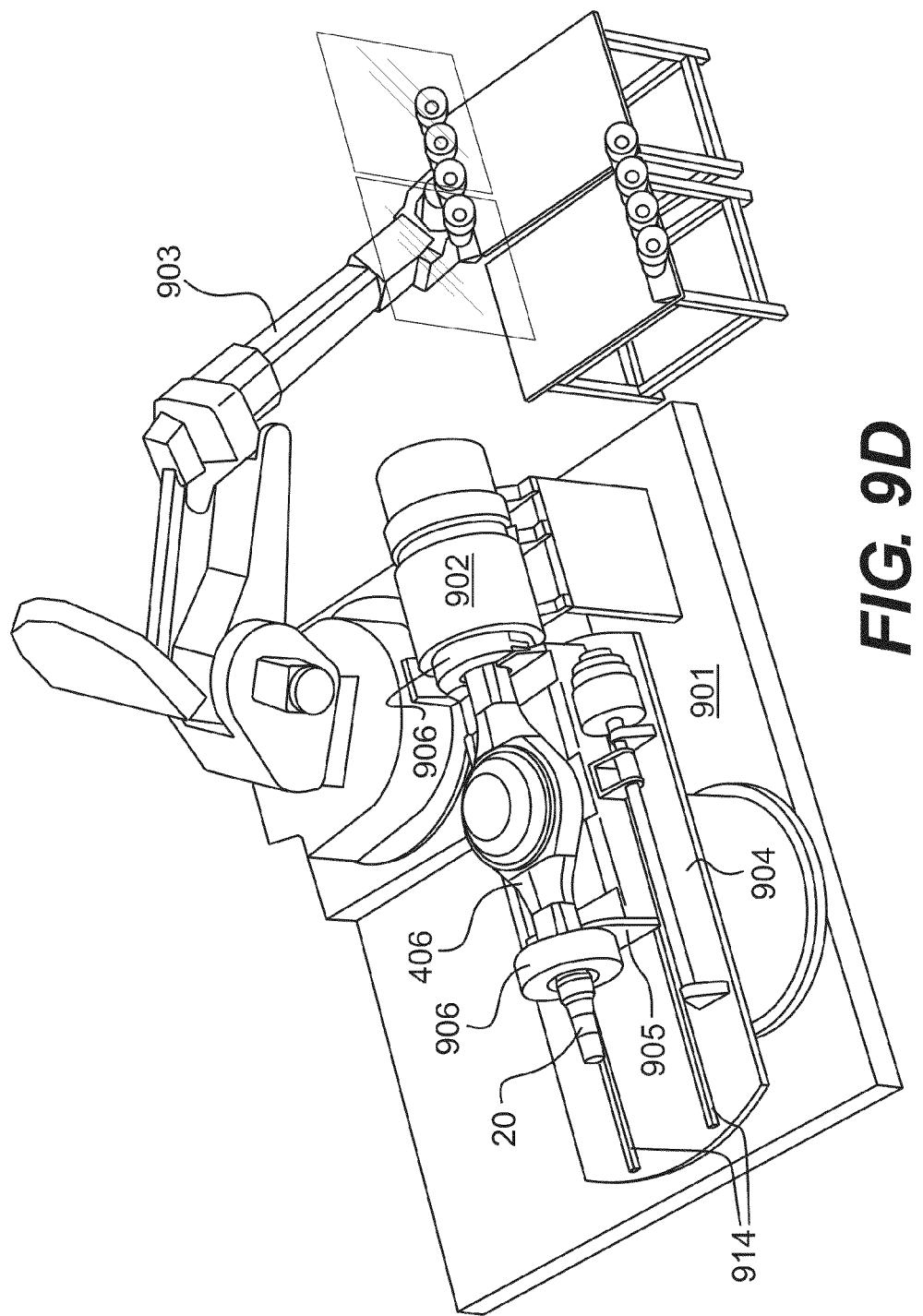

Referring back to FIG. 9C, once the finished spindle 20 is welded to the extremity 51 of the first end 18, the jig 905 is moved back from the welding machine 902 along the axis 916 and the turntable 904 is rotated about the rotating axis 922 oriented perpendicularly to the axis 916, so that the second end 19 of the axle sub-assembly 406 is aligned with the welding machine 902. During this step, the robotic arm 903 loads a new finished spindle 20 into the welding machine 902. The jig 905 is then moved along the tracks 914 toward the welding machine 902 until the clamping bracket 906 abuts against the wall 940 of the receiving portion 942 of the welding machine 902 as illustrated in FIG. 9D. The second finished spindle 20 is spin welded to the second end 19 of the axle sub-assembly 406 in the same way as the first spindle 20 was welded to the first end 18 as previously described with reference to FIG. 9B.

Figure 9E:
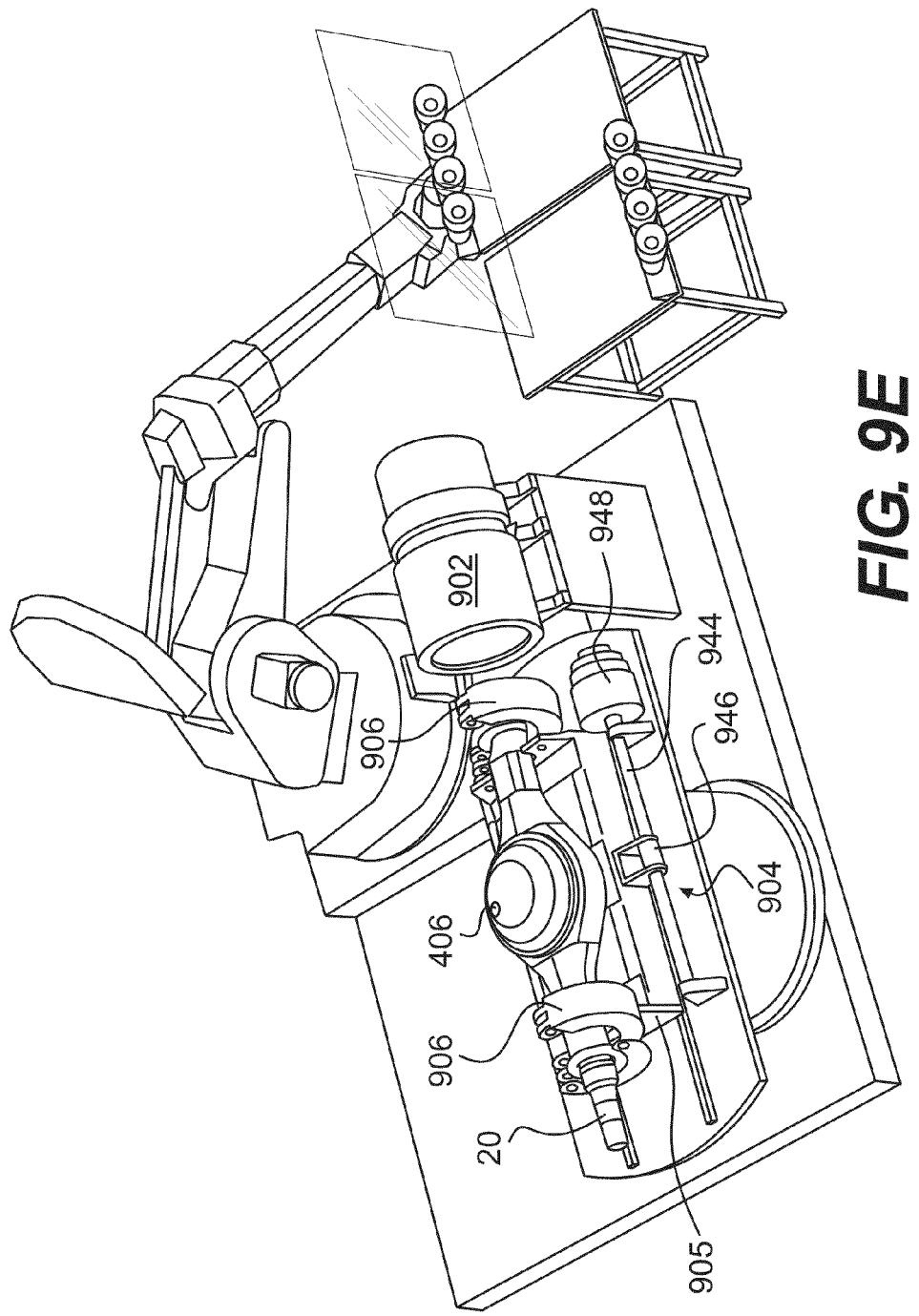

As shown in FIG. 9E, the jig 905 is then moved back from the welding machine 902 along the axis 916 by the action of the endless screw 944. The axle sub-assembly 406 is then released from the clamping brackets 906.

Figure 9F:
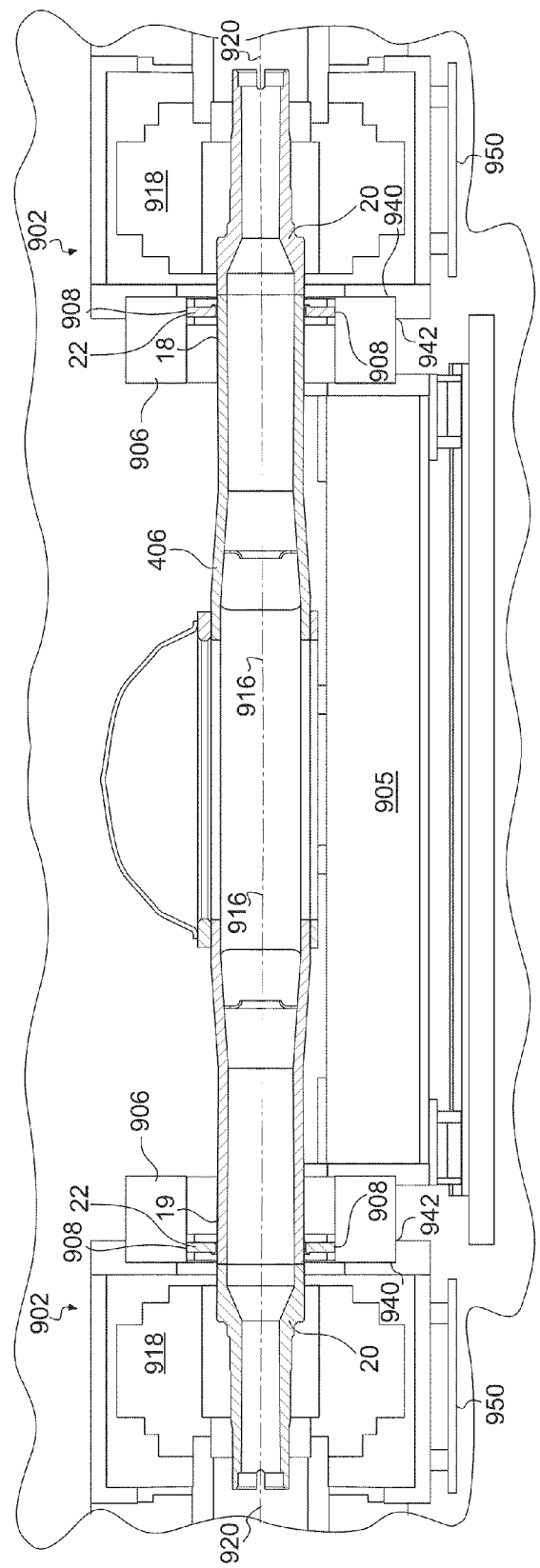
FIG. 9F is a partial cross-sectional view of an apparatus for assembling the spindles to the axle sub-assembly of FIG. 7 according to a second embodiment.

Referring to FIG. 9F, according to a second embodiment, the jig 905 is fixed in position. Two welding machines 902 are provided at opposite ends of the jig 905, facing respective ends 18, 19 of the axle sub-assembly 406 when the axle sub-assembly 406 is received and held in the jig 905. The welding machines 902 are mounted on respective tracks 950 similar to the tracks 914 of FIGS. 9A-9E, and movable along the axis 916 via an endless screw (not shown) similar to the endless screw 944 of FIG. 9E. The welding machines 902 each receive a finished spindle 20, and the welding machines 902 are then moved along the tracks 950 toward the respective ends 18, 19 of the axle sub-assembly 406 until each clamping bracket 906 abuts against the wall 940 of the respective welding machine 902, ensuring precise alignment between the finished spindle 20 and the brake flange 22. Both spindles 20 are simultaneously welded to the axle sub-assembly 406 by rotation about the spin welding axis 920, similarly to the manner described above with respect to FIG. 9B. As described above with respect to the embodiment shown in FIGS. 9A to 9E, when welding the finished spindles 20 to the axle sub-assembly 406, the spin welding axes 920 can be coaxial with the longitudinal axis 916 of the axle sub-assembly 406 or be disposed at an angle to the axis 916 in order to have a predetermined amount of camber and/or toe. The welding machines 902 are then moved away from the axle sub-assembly 406 along the tracks 950, and the axle sub-assembly 406 is released from the clamping brackets 906. Other components shown in FIG. 9F are similar to those discussed above with respect to FIGS. 9A-9E, and as such they have been given the same reference numbers and will not be described in detail. In this embodiment, welding both spindles 20 concurrently reduces the total amount of time required for the assembly of the finished axle compared to the embodiment of FIGS. 9A-9E where each spindle 20 is welded to the axle sub-assembly 406 separately.

The assembly of the axle 10 illustrated in FIG. 1 is then completed. As would be understood from the above description, the assembly of the finished spindles 20 to the axle sub-assembly 406 is based on splitting of the conventional spin welding machine into two parts: one holding the brake flanges 22 and axle housing assembly (jig 905 and turntable 904) while the other (welding machine 902) holds the spindle 20 so as to weld it accurately to axle sub-assembly 406. By this process of assembly, the part once clamped is never released until the assembly is complete. Because the finished surfaces of both brake flanges 22 are clamped at the same time in the jig 905 and are never released until both spindles 20 are welded, this allows for the precise positioning and welding of the spindles 20 relative to the corresponding brake flanges 22 that is required for the braking system to be installed to function properly. The precise assembly of finished spindles 20 and brake flanges 22 allows the axle sub-assembly 406 to be machined in a way that takes significantly less time and occupies significantly less floor space than conventional methods.

Figure 10:
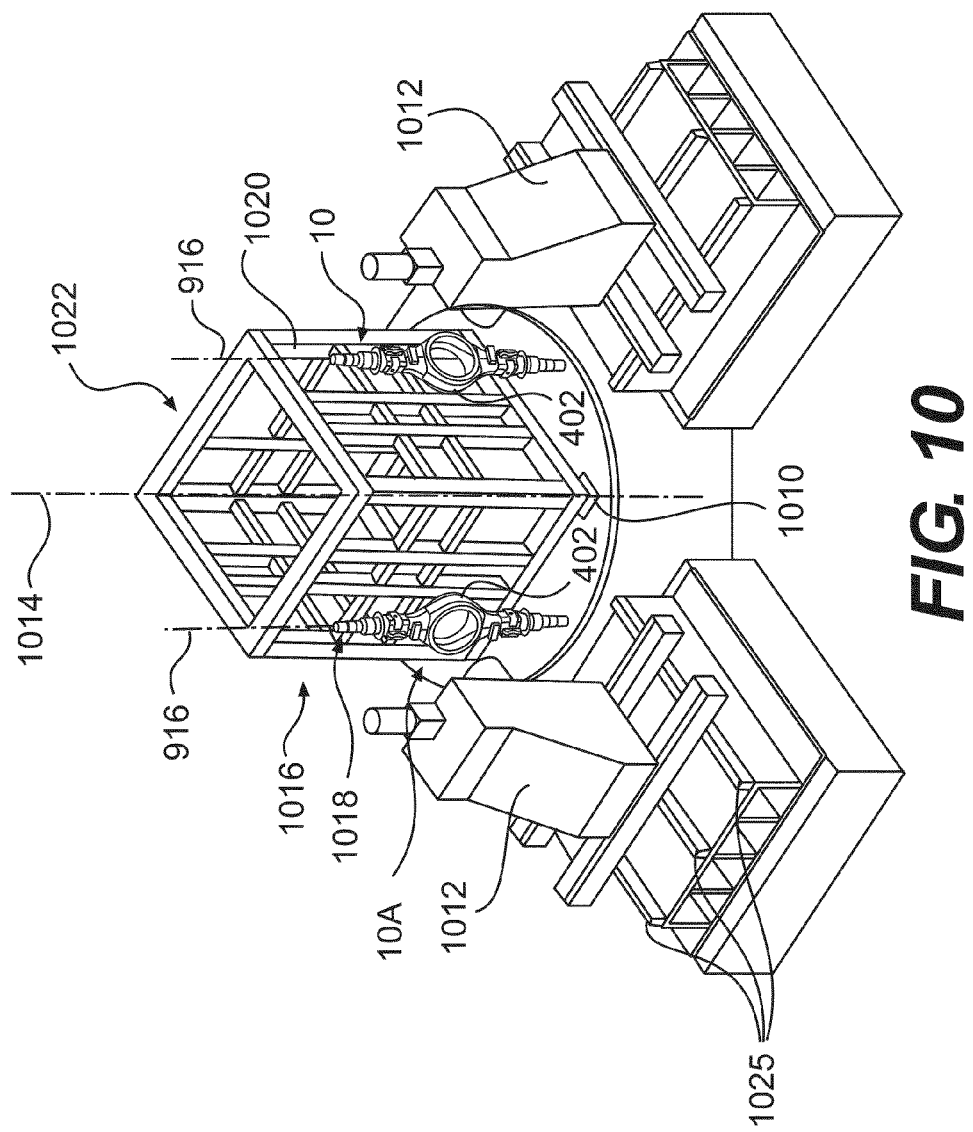
FIG. 10 is a perspective view of a machining station for performing various machining operations after the axle is fully assembled.

Although the spindles 20 are finished before welding and require no further machining, machining may be required on other parts of the axle 10, such as the inside of the axle housing 402. Referring to FIG. 10, the completed axle 10 (including finished spindles 20 and finished brake flanges 22) is mounted on a dial indexing table 1010 such that its longitudinal axis 916 is oriented vertically. Two CNC machines 1012, 1013 are positioned around the periphery of the dial indexing table 1010, facing the sides 1018 and 1020 of the dial indexing table 1010. The vertical orientation of the axle sub-assembly 406 significantly reduces the size of the dial indexing table 1010 required, and reduces the amount of travel required for the CNC machines 1012, 1013 to access and machine all of the parts of the axle sub-assembly 406.

When the dial indexing table 1010 is in a loading position, an axle 10 is mounted on the side 1016 of the dial indexing table 1010. The dial indexing table 1010 preferably grips one or more of the finished spindles 20, or one or more of the finished brake flanges 22, to ensure precise alignment of the axle 10 on the dial indexing table 1010 relative to the datums 404, and therefore of the axle 10 to the CNC machines 1012, 1013, resulting in accurate machining. The finished spindles 20 allow more precise machining, using a reduced amount of factory space, compared to an axle having rough spindles, both because the axle 10 can be precisely positioned and machined in a vertical orientation with respect to the finished spindles 20 and because the axle 10 does not need to be additionally manipulated in order to machine the spindles 20. The dial indexing table 1010 then rotates about the vertical axis 1014 to a machining position, where the axle 10 is on the side 1018, facing the first CNC machine 1012. The CNC machine 1012 is mounted on rails 1025. When the motion of the dial indexing table 1010 stops and the axle 10 is facing the first CNC machine 1012, the CNC machine 1012 is moved forward and performs a first machining operation on the axle 10, for example machining the inside of the axle housing 402. While the first machining operation is taking place, a second axle 10A can be mounted on the side 1016 of the dial indexing table 1010. The dial indexing table 1010 then rotates about the vertical axis 1014 to a another machining position, wherein the axle 10 is on the side 1020, facing the second CNC machine 1013, and the axle 10A is on the side 1018, facing the first CNC machine 1012. The CNC machine 1013 is moved along the rails 1025 toward the dial indexing table 1010 and performs a second machining operation on the axle 10. While the second machining operation is taking place, the second axle 10A is facing the first CNC machine 1012, and the first machining operation can be performed on the axle 10A. In this manner, more than one machining operation can be performed simultaneously, thereby reducing the total manufacturing time of the axle 10. The dial indexing table 1010 then rotates to an unloading position, wherein the finished axle 10 is removed from the dial indexing table 1010 to allow another axle 10 to be mounted thereon. It is contemplated that the unloading position may be the same as the loading position, such that the axle 10 is mounted and removed at the same position.

It is contemplated that a third CNC machine similar to the CNC machines 1012, 1013 may be provided facing the side 1022 of the dial indexing table 1010, or that only a single CNC machine 1012 may alternatively be used, depending on the extent of the machining operations required after assembly. If more machining is required, adding a third CNC machine would allow the various machining operations to take place in three stages, such that three axle subassemblies 406 could be machined simultaneously to reduce the total manufacturing time. If less machining is required, using fewer CNC machines could save costs.

At step 245, additional operations may optionally be performed on the finished axle, such as load testing of the welds, washing, painting and packing the axle for shipping. These steps are all conventional and will not be described here in detail.

The process ends at step 250.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:
1. A method of manufacturing an axle, comprising:
creating at least one datum in an axle housing;
welding at least one finished brake flange to the axle housing at least in part with reference to the at least one datum to form an axle sub-assembly;
welding at least one finished spindle to the axle sub-assembly at least in part with reference to the at least one datum;

welding at least one bracket to the axle housing at least in part with reference to the at least one datum, prior to welding the at least one finished brake flange to the axle housing; and wherein:
the axle housing is not straightened after welding the at least one bracket to the axle housing.

2. The method of manufacturing an axle according to claim 1, wherein:
welding the at least one finished spindle to the axle housing at least in part with reference to the at least one datum includes locating the at least one spindle on the axle housing at least in part with reference to a location of the at least one brake flange.

3. The method of manufacturing an axle according to claim 1, further comprising:
welding at least one ring to the axle housing prior to welding the at least one finished brake flange to the axle housing, the at least one ring being located on the axle housing at least in part with reference to the at least one datum.

4. The method of manufacturing an axle according to claim 1, further comprising:
welding at least one cover to the axle housing prior to welding the at least one finished brake flange to the axle housing, the at least one cover being located on the axle housing at least in part with reference to the at least one datum.

* * * * *